(12) United States Patent
Beljambe et al.

(10) Patent No.: US 10,280,797 B2
(45) Date of Patent: May 7, 2019

(54) CASING STRUCTURE WITH CONNECTION TABS

(71) Applicant: SNECMA, Paris (FR)

(72) Inventors: Ceddric Beljambe, Soignolles en Brie (FR); Noël Robin, Villejust (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 369 days.

(21) Appl. No.: 14/915,055

(22) PCT Filed: Aug. 25, 2014

(86) PCT No.: PCT/FR2014/052119
§ 371 (c)(1),
(2) Date: Feb. 26, 2016

(87) PCT Pub. No.: WO2015/033040
PCT Pub. Date: Mar. 12, 2015

(65) Prior Publication Data
US 2016/0208654 A1    Jul. 21, 2016

(30) Foreign Application Priority Data

Sep. 4, 2013 (FR) .................................... 13 58476

(51) Int. Cl.
| | | |
|---|---|---|
| *F01D 25/24* | (2006.01) | |
| *F01D 9/04* | (2006.01) | |
| *B64D 27/26* | (2006.01) | |

(52) U.S. Cl.
CPC .......... *F01D 25/243* (2013.01); *B64D 27/26* (2013.01); *F01D 9/04* (2013.01); *F01D 25/246* (2013.01);

(Continued)

(58) Field of Classification Search
CPC ........ F01D 25/243; F01D 25/246; F01D 9/04; B64D 27/20; B64D 27/26; F02C 7/20
See application file for complete search history.

(56) References Cited

U.S. PATENT DOCUMENTS 9,212,567 B2 * 12/2015 Rauch ..................... F01D 25/30
2006/0251496 A1 * 11/2006 Wood ........................ F16B 5/02
411/507

(Continued)

FOREIGN PATENT DOCUMENTS

| EP | 2 072 397 A2 | 6/2009 |
|---|---|---|
| WO | WO 2010/007220 A2 | 1/2010 |
| WO | WO 2012/013889 A1 | 2/2012 |

OTHER PUBLICATIONS

International Search Report as issued in International Patent Application No. PCT/FR2014/052119, dated Nov. 21, 2014.

*Primary Examiner* — Jason D Shanske
*Assistant Examiner* — Brian O Peters
(74) *Attorney, Agent, or Firm* — Pillsbury Winthrop Shaw Pittman LLP

(57) ABSTRACT

A casing structure interposed between the engine and the nacelle of an aircraft, the casing structure including a shroud surrounding the engine and including a plurality of sectors; at least one radial arm providing the connection to the nacelle; and a plurality of fasteners for securing the plurality of shroud sectors to one another or to the at least one radial arm; the plurality of fasteners including a plurality of connection tabs, each provided with two parallel series of holes for receiving two respective series of headed bolts, a first series passing through a corresponding set of orifices of one shroud sector, and a second series passing through a corresponding set of orifices of an adjacent shroud sector or an adjacent radial arm.

5 Claims, 1 Drawing Sheet

(52) U.S. Cl.
CPC ...... *F05D 2230/60* (2013.01); *F05D 2240/11* (2013.01); *F05D 2260/30* (2013.01)

(56)  References Cited

U.S. PATENT DOCUMENTS

| | | | |
|---|---|---|---|
| 2010/0024435 A1 | 2/2010 | Vauchel | |
| 2011/0073745 A1* | 3/2011 | Duchatelle | F01D 9/04 248/637 |
| 2013/0032669 A1* | 2/2013 | Porte | B64D 33/02 244/131 |
| 2013/0055725 A1 | 3/2013 | Rauch et al. | |

* cited by examiner

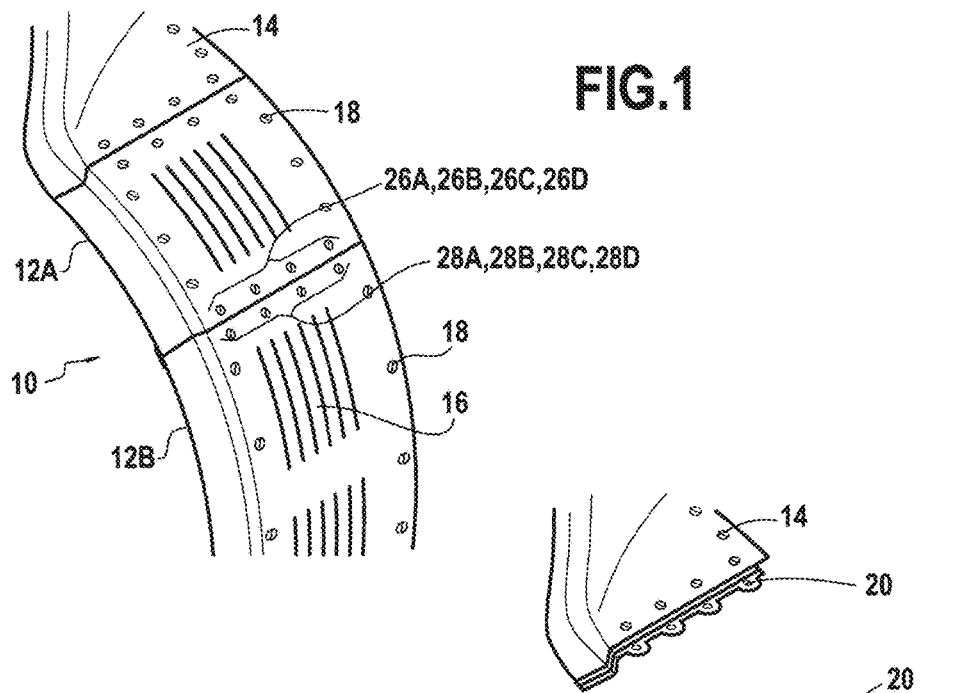
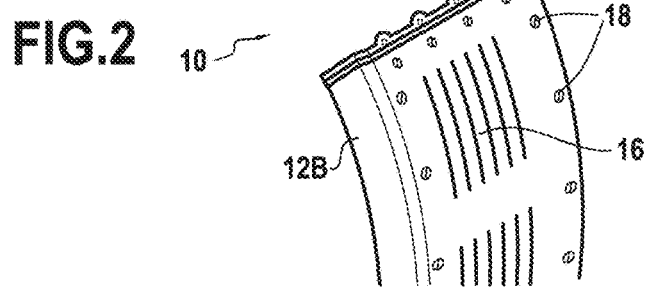
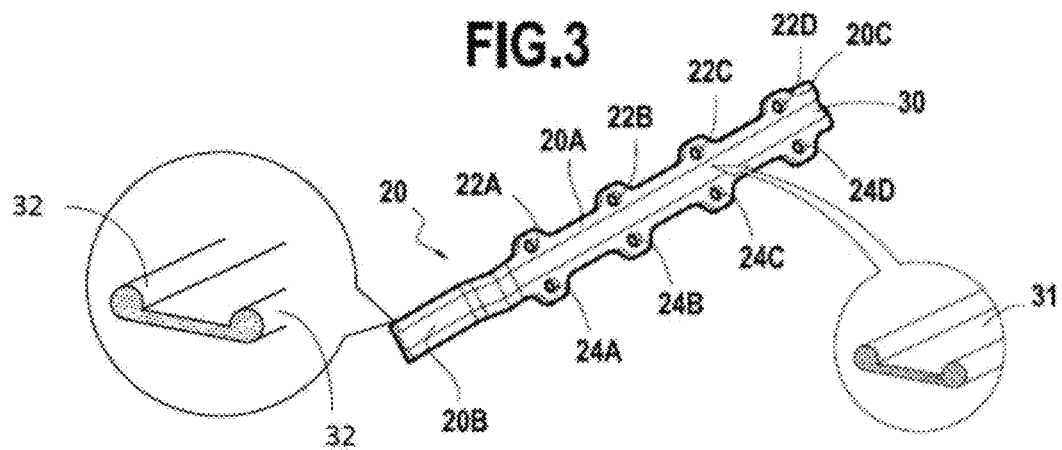

CASING STRUCTURE WITH CONNECTION TABS

CROSS-REFERENCE TO RELATED APPLICATIONS

This application is the U.S. National Stage of PCT/FR2014/052119, filed Aug. 25, 2014, which in turn claims priority to French patent application number 1358476, filed Sep. 4, 2013. The content of these applications are incorporated herein by reference in their entireties.

BACKGROUND OF THE INVENTION

The present invention relates to the field of aircraft engines, for example turbojets, and it relates more particularly to a casing structure interposed between the engine and the nacelle.

In known manner, in addition to providing the mechanical junction between the engine and the nacelle, such a structure must:
- provide continuity of the aerodynamic passage for the bypass stream;
- pass and hold (electrical, mechanical, hydraulic) services between the various components of the engine (core, fan, etc.) and the nacelle of the engine;
- provide fireproofing protection between the various compartments of the engine and the bypass stream; and
- provide accessibility to pieces of equipment and to services for maintenance purposes.

The casing structure is made up both of a sectorized cylindrical frame (or of shroud sectors) of small width (of the order of a few hundreds of millimeters around the axis of the engine) suitable for giving easy access on opening the nacelle to the pieces of equipment that it covers (e.g. the thrust take-up rods, or indeed various actuators for actuating services), and also of at least one radial arm arranged around the frame. Conventionally, the frame also supports scoops of the air bleed system (variable bleed valve (VBV) booster).

Since the time required for maintenance needs to be optimized, the frame thus constitutes an obstacle to accessing pieces of equipment placed beneath it, to enable them to be removed, changed, or verified . . . , on apron and on opening the nacelle in time that is limited and depends on the application, and that needs to take account of the time required for removing and replacing the frame itself.

There thus exists a need for a casing structure that provides easy access to these pieces of equipment (i.e. access that is compatible with the time authorized for maintenance on the ground), while enabling all of the above-mentioned functions to be performed and in particular while ensuring reduced disturbance in the air flow passage.

OBJECT AND SUMMARY OF THE INVENTION

A main object of the present invention is thus to mitigate such drawbacks by proposing a casing structure interposed between the engine and the nacelle of an aircraft, the casing structure comprising:
- a shroud surrounding the engine and comprising a plurality of sectors;
- at least one radial arm providing the connection to the nacelle; and
- a plurality of fastener means for securing said plurality of shroud sectors to one another or to said at least one radial arm;

the casing structure being characterized in that said plurality of fastener means comprise a plurality of connection tabs, each provided with two parallel series of holes for receiving two respective series of headed bolts, a first series passing through a corresponding set of orifices of one shroud sector, and a second series passing through a corresponding set of orifices of an adjacent shroud sector or an adjacent radial arm.

Thus, the presence of two parallel rows of bolts, each serving to fasten a shroud sector enables a given sector to be removed independently of neighboring sectors in order to access equipment or services covered by that sector.

Preferably, said orifices of said shroud sectors or said radial arms include chamfers at their inlets in order to fit against the heads of said headed bolts and thus enable them to be mounted flush.

Advantageously, said connection tab is in the form of a bridge with a top portion for receiving said two parallel series of holes and two lateral portions, each terminated by a rim that is to form a support for a corresponding lateral portion of said shroud sector or of said radial arm. The length of said connection tab corresponds to the width of said shroud.

Preferably, said connection tab has running along its entire length a central groove for receiving a sealing gasket that, by putting said adjacent shroud sectors or the radial arm adjacent to said shroud sector edge-to-edge, serves to guarantee aerodynamic airtightness between said shroud sectors or said radial arms.

The invention also provides any aeroengine including a casing structure as specified above.

BRIEF DESCRIPTION OF THE DRAWING

Other characteristics and advantages of the present invention appear from the following description made with reference to the accompanying drawing, which shows an embodiment having no limiting character, and in which:

FIG. 1 is a view of a casing structure interposed between the engine and the nacelle of an aircraft in accordance with the invention;

FIG. 2 is a view of the FIG. 1 casing structure with a shroud sector removed; and FIG. 3 is a detail view of FIG. 2 showing the connection tab.

DETAILED DESCRIPTION OF AN EMBODIMENT

FIGS. 1 and 2 show a portion of the casing structure 10 interposed between the engine and the nacelle of an aircraft, typically a turbojet, respectively in the assembled position and in the partially disassembled position, the casing structure being in the form of a sectorized shroud (with only two sectors 12A and 12B being shown) that is connected by at least one radial casing support arm (e.g. the radial arm 14). Depending on the circumference of the engine, on the positions of pieces of equipment such as thrust take-up rods, and on the actuators for actuating the VBVs or variable stator vanes (VSVs), for example, the shroud may comprise up to eight adjacent sectors that are separable from one another and that are mounted between a plurality of regularly distributed radial arms. Each shroud sector is pierced by openings 16 acting as scoops for one of the air discharge systems of the engine (e.g. the variable bleed valve or VBV system). The shroud sectors are held radially to the casing hub (not shown) via a nut-and-bolt system passing through the housings 18 in these shroud sectors.

According to the invention, the shroud sectors are secured to one another or to the radial arms by fastener means each comprising a connection tab 20 serving to hold them respectively while making the connection between them airtight relative to the bypass stream.

The connection tab 20 shown in greater detail in FIG. 3 is of length (along the engine axis) that corresponds to the width of the shroud sectors and it is in the form of a bridge having a top portion 20A (as contrasted to its lateral portions 20B and 20C) provided with two parallel series of holes 22A, 22B, 22C, 22D; 24A, 24B, 24C, 24D that are to receive bolts, typically headed bolts (not shown). For example, for a shroud having a width of 350 millimeters (mm) (along the engine axis), it is possible to select a tab that has two series of four holes, presenting a width of about 40 mm and a thickness of a few millimeters.

The two parallel series of holes are for receiving two respective series of headed bolts, a first series passing through a corresponding set of orifices 26A, 26B, 26C, and 26D of one shroud sector 12A, and a second series for passing through a corresponding set of orifices 28A, 28B, 28C, and 28D of an adjacent shroud sector 12B or of an adjacent radial arm. The orifices in the shroud sectors or in the radial arms advantageously have chamfers at their inlets in order to receive the heads of these headed bolts and thus enable them to be mounted flush so that the head of each bolt is positioned exactly therein so as to be in alignment with the top faces of these elements that come into contact with the bypass air stream, thereby not constituting any obstacle for the bypass air stream so as to ensure that it presents aerodynamic continuity.

Thus, by having two series of holes in each tab, it is possible during a maintenance operation on equipment under the shroud (e.g. for periodic inspection of thrust take-up rods) to remove quickly and easily a single sector covering the rod in question, while continuing to hold the tab on the adjacent sector.

It should be observed that the tab presents along its entire length a central groove 30 that makes it possible to put adjacent sectors (or a sector and the radial arm for connecting together) in an edge-to-edge position, which groove has a bottom that receives a gasket 31 so as to provide a genuinely aerodynamically airtight connection between the sectors. In addition, two opposite rims 32 terminate each of the lateral portions 20B and 20C and form supports for the corresponding lateral portions of the shroud sector or of the radial arm to be connected together.

The invention claimed is:

1. A casing structure fitted for providing a mechanical junction between an engine and a nacelle of an aircraft, the casing structure comprising:
   a shroud configured to surround the engine and comprising a plurality of shroud sectors;
   at least one radial arm arranged around said shroud and configured to provide the connection with the nacelle; and
   a plurality of fasteners configured to secure said plurality of shroud sectors to one another or to said at least one radial arm;
   said plurality of fasteners comprising a plurality of connection tabs, each provided with two parallel series of holes for receiving two respective series of headed bolts, a first series passing through a corresponding set of orifices of one shroud sector, and a second series passing through a corresponding set of orifices of an adjacent shroud sector or an adjacent radial arm,
   wherein each of said connection tabs is in the form of a bridge with a top portion for receiving said two parallel series of holes and extended by two lateral portions, each terminated by a rim that is to form a support for a corresponding lateral portion of said shroud sector or of
   said at least one radial arm,
   wherein a length of each of said connection tabs corresponds to a width of said shroud, and wherein each of said connection tabs has running along its entire length a central groove for receiving a sealing gasket that, by putting said adjacent shroud sectors or the at least one radial arm adjacent to said shroud sector edge to edge, serves to guarantee aerodynamic airtightness between said shroud sectors or said at least one radial arm.

2. The casing structure according to claim 1, wherein said orifices of said shroud sectors or said at least one radial arm include chamfers at their inlets in order to fit against the heads of said headed bolts and thus enable them to be mounted flush.

3. An aeroengine including the casing structure according to claim 1.

4. The casing structure according to claim 1, wherein the two lateral portions are provided on opposite ends of the top portion.

5. The casing structure according to claim 1, wherein said two parallel series of holes are absent in said two lateral portions.

* * * * *